United States Patent
Tryban et al.

(10) Patent No.: US 12,387,498 B1
(45) Date of Patent: Aug. 12, 2025

(54) METHOD AND SYSTEM FOR DETECTING A REQUEST FOR DISTRESS ASSISTANCE

(71) Applicant: MOTOROLA SOLUTIONS, INC., Chicago, IL (US)

(72) Inventors: Lindsey R Tryban, Schaumburg, IL (US); Jian Lou, Arlington Heights, IL (US); Mateusz Biernacki, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 18/751,587

(22) Filed: Jun. 24, 2024

(51) Int. Cl.
*G06V 20/52* (2022.01)
*G06T 7/70* (2017.01)
*G06V 40/20* (2022.01)
*G07C 9/00* (2020.01)
*G08B 21/02* (2006.01)

(52) U.S. Cl.
CPC ................ *G06V 20/52* (2022.01); *G06T 7/70* (2017.01); *G06V 40/20* (2022.01); *G07C 9/00174* (2013.01); *G08B 21/02* (2013.01); *G06V 2201/07* (2022.01)

(58) Field of Classification Search
CPC .......... G06V 20/52; G06V 40/20; G06T 7/70; G08B 21/02; G07C 7/00174
USPC ................................ 348/169, 207.99, 208.14
See application file for complete search history.

(56) References Cited

U.S. PATENT DOCUMENTS

| | | | | |
|---|---|---|---|---|
| 10,139,921 | B2 * | 11/2018 | Karmon | G06V 40/28 |
| 10,943,463 | B1 * | 3/2021 | Clark | G08B 21/0438 |
| 2012/0081229 | A1 * | 4/2012 | Daniel | G08B 13/19615 |
| | | | | 340/573.1 |
| 2016/0148488 | A1 * | 5/2016 | Tijerina | G07F 9/026 |
| | | | | 705/325 |
| 2023/0386259 | A1 * | 11/2023 | Chakradhar | G06V 20/52 |

OTHER PUBLICATIONS

Niemiec, Pawel, et al.: "System and Method for Notifying a Guardian When an Expected Gesture from a Monitored User is Not Received", U.S. Appl. No. 18/544,921, filed Dec. 19, 2023, all pages.

* cited by examiner

*Primary Examiner* — Daquan Zhao

(57) ABSTRACT

A method and system for detecting a request for distress assistance is disclosed. An electronic screen of the system is configured to display visible information that instructs on a human performance of a clandestine gesture that will indicate the request for distress assistance. The method includes carrying out video analytics on video to automatically detect and recognize that the human has communicated the clandestine gesture via an at least one surveillance camera that captured the video. The method also includes determining, based on the communicated clandestine gesture and contextual information, a level of urgency of the request for distress assistance indicated by the clandestine gesture. The method also includes generating an electronic notification or electronic alert, based on the level of urgency, corresponding to an expected assistance action to be taken by a designated assistance person.

19 Claims, 6 Drawing Sheets

METHOD AND SYSTEM FOR DETECTING A REQUEST FOR DISTRESS ASSISTANCE

BACKGROUND

A distress hand signal is a hand gesture that a person can make to indicate their distress and need of rescue. At sea, the oldest hand signal to indicate distress is to flap one's arms up and down. Another more recently created distress hand signal is the so-called "Signal for Help". The Signal for Help is a single-handed gesture that can be used over a video call or in person by an individual to alert others that they feel threatened and are in need of help. The signal is performed by holding one hand up with the thumb tucked into the palm, then folding the four other fingers down, symbolically trapping the thumb by the rest of the fingers. A problem with these above-described signals is that they may be understood by not only someone who may be able to help the distressed person, but also they may be understood by a captor or abuser of the distressed person.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
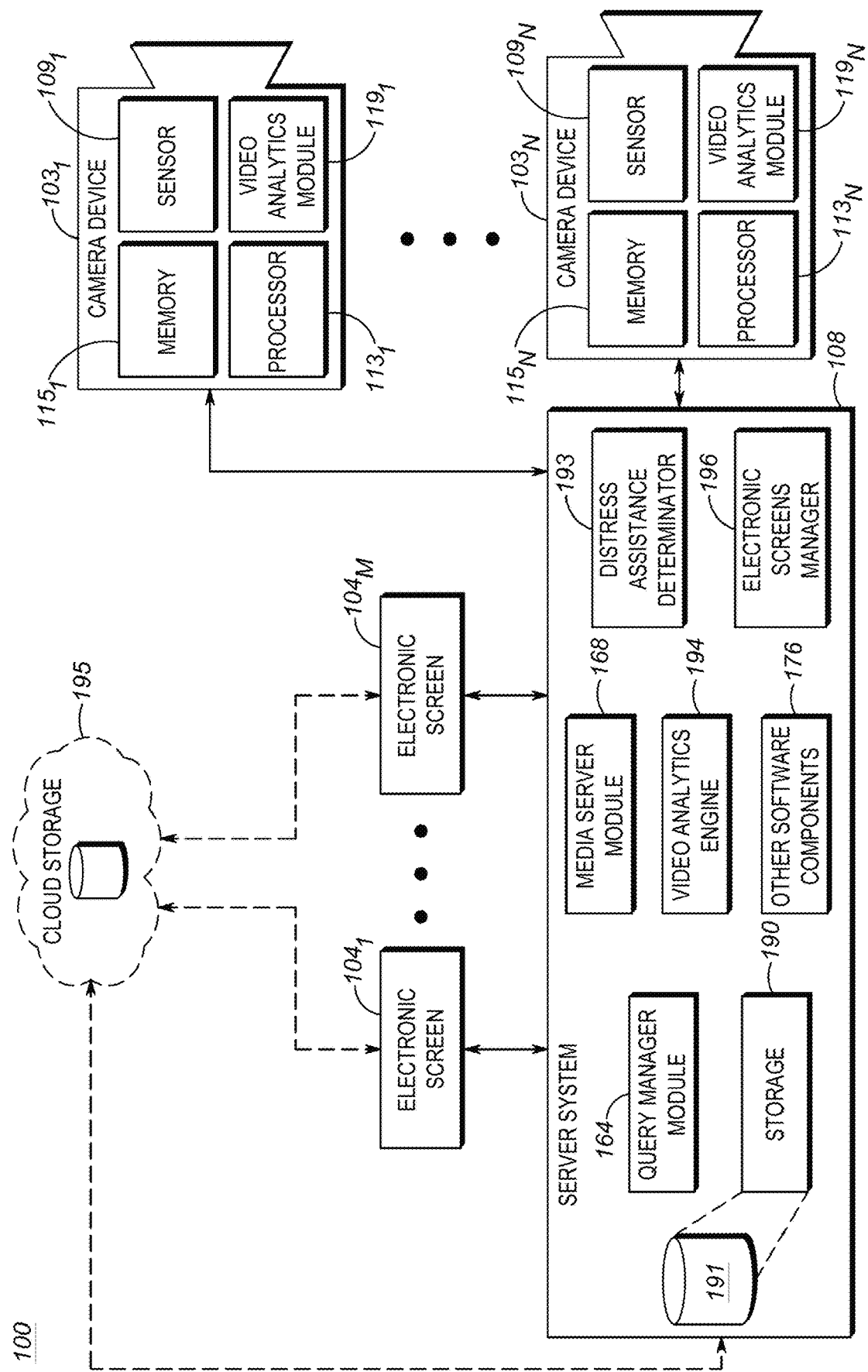
FIG. 1 is a block diagram of a system in accordance with example embodiments.

Skilled artisans will appreciate that elements in the figures are illustrated for simplicity and clarity and have not necessarily been drawn to scale. For example, the dimensions of some of the elements in the figures may be exaggerated relative to other elements to help improve an understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

In accordance with one example embodiment, there is provided a system that includes an electronic screen configured to display visible information that includes at least one of: i) text; and ii) one or more images. The visible information instructs on a human performance of a clandestine gesture that will indicate a request for distress assistance. The visible information will cease to appear on the electronic screen after a period of time. The system also includes at least one surveillance camera configured to capture video within which a human appears. The system also includes at least one processor in communication with the at least one surveillance camera. The system also includes at least one electronic storage medium storing program instructions that when executed by the at least one processor cause the at least one processor to perform carrying out video analytics on the video to automatically detect and recognize that the human has communicated the clandestine gesture via the at least one surveillance camera. The at least one processor is also caused to perform determining, based at least in part on the video, contextual information from a location associated with the communicated clandestine gesture. The location is remote from the electronic screen. The at least one processor is also caused to perform determining, based on the communicated clandestine gesture and the contextual information, a level of urgency of the request for distress assistance indicated by the clandestine gesture. The at least one processor is also caused to perform generating an electronic notification or electronic alert, based on the level of urgency, corresponding to an expected assistance action to be taken by a designated assistance person.

In accordance with another example embodiment, there is provided a computer-implemented method that includes carrying out video analytics on video to automatically detect and recognize that a human has communicated a clandestine gesture via an at least one surveillance camera that captured the video. The computer-implemented method also includes determining, using an at least one processor and based at least in part on the video, contextual information from a location associated with the communicated clandestine gesture. The location is remote from an electronic screen that, prior to the human having communicated the clandestine gesture, displayed visible information that instructed the human on performing the clandestine gesture to indicate a request for distress assistance. The computer-implemented method also includes determining, using an the least one processor and based on the communicated clandestine gesture and the contextual information, a level of urgency of the request for distress assistance indicated by the clandestine gesture. The computer-implemented method also includes generating, using an the least one processor, an electronic notification or electronic alert, based on the level of urgency, corresponding to an expected assistance action to be taken by a designated assistance person.

Each of the above-mentioned embodiments will be discussed in more detail below, starting with example system and device architectures of the system in which the embodiments may be practiced, followed by an illustration of processing blocks for achieving an improved technical method, device, and system for detecting a request for distress assistance.

Example embodiments are herein described with reference to flowchart illustrations and/or block diagrams of methods, apparatus (systems) and computer program products according to example embodiments. It will be understood that at least some blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular FIG. 1 which is a block diagram of an example system 100 within which methods in accordance with example embodiments can be carried out. Included within the illustrated system 100 are a plurality of electronic screens 1041-104M (hereinafter interchangeably referred to as "electronic screens 1041-104M" when referring to all of the illustrated electronic screens, or "electronic screen 104" when referring to any individual one of the plurality). While a plurality of electronic screens are shown in FIG. 1, this is for convenience of illustration (i.e. even a single electronic screen 104 is contemplated). Also included within the illustrated system 100 is a server system 108 (explained later herein in more detail).

In some example embodiments, the electronic screen 104 may take the form of a fixed-location display installable in a privacy stall. Various types of locations (e.g. premises) where this privacy stall may be found are contemplated. Examples of these types of locations include the following: a transportation hub (airport, train station, etcetera), a convention center, an alcohol serving establishment, and a school. It is contemplated that one or more security-supporting networks may be installed in these types of locations, and the system 100 may form a part of these one or more networks.

With respect to the server system 108 of the system 100, this could comprise a single physical machine or multiple physical machines. It will be understood that the server system 108 need not be contained within a single chassis, nor necessarily will there be a single location for the server system 108.

The illustrated server system 108 communicates with the electronic screen 104 through one or more networks. These networks can include the Internet, or one or more other public/private networks coupled together by network switches or other communication elements. As an example and not by way of limitation, the electronic screen 104 can communicate with an ad-hoc network, a Personal Area Network (PAN), a Local Area Network (LAN), a Wide Area Network (WAN), a Metropolitan Area Network (MAN), or one or more portions of the Internet or a combination of two or more of these. One or more portions of one or more of these networks may be wireless. As an example, the electronic screen 104 may be capable of communicating with a Wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these.

Still with reference to FIG. 1, the server system 108 includes several software components for carrying out other functions of the server system 108. For example, the server system 108 includes a media server module 168. The media server module 168 handles client requests related to storage and retrieval of video taken by camera devices 1031-103N in the system 100. Also, in respect of these client requests and the like, it will be understood that the server system 108 may communicate with, for example, mobile electronics devices (smartphones, tablets, two-way radio, etcetera) and other types of client devices. In some examples, these mobile electronics devices may be configured to wirelessly receive electronic notifications or electronic alerts (as described in more detail later herein). Furthermore, each of at least some of these mobile electronics devices may be configured to perceivably output an electronic notification or electronic alert as at least one of: i) a visible message displayed on a screen of the respective mobile electronics device; and ii) an audible message emitted from a speaker of the respective mobile electronics device.

The illustrated server system 108 also includes a video analytics engine 194. The video analytics engine 194 can, in some examples, be any suitable one of known commercially available software that carry out computer vision related functions (complementary to any video analytics performed in the surveillance cameras) as understood by a person of skill in the art. Other suitable implementation alternatives, apparent to those skilled in the art, are also contemplated. In at least some examples, the video analytics engine 194 includes learning machine(s) in support of the operation of the video analytics engine 194.

The illustrated server system 108 also includes a number of other software components 176. These other software components will vary depending on the requirements of the server system 108 within the overall system. As one example, the other software components 176 might include special test and debugging software, or software to facilitate version updating of modules within the server system 108.

Regarding the data store 190, this comprises, for example, one or more databases 191 which may facilitate the organized storing of recorded video captured by camera devices, other sensor data, etc. in accordance with example embodiments. The one or more databases 191 may also contain metadata related to, for example, the recorded video that is storable within the one or more data stores 190. Examples of metadata that may be expected to be derived directly or indirectly from video data include location in field of view, object ID, bounding box-related data, tracking position relative to field of view, etc. The one or more databases 191 may also contain records and data concerning visual information displayed on the electronic screens 1041-104M. Example mock database content for displayed visual information corresponding to a mock "tap, cross" gesture is shown in Table 1 below.

TABLE 1

"Tap Cross" Information Display History

| Location | Display ID Number | Date & Time Start | Stop | Entry/Exit Camera(s) |
|---|---|---|---|---|
| Washroom A | 2 | Oct. 15, 2023 7:23:23 | Oct. 15, 2023 7:45:44 | 10 |
| Washroom B | 3 | Oct. 15, 2023 8:01:11 | Oct. 15, 2023 8:28:76 | 11, 13 |

Records and data contained in the one or more databases 191 may be retrievable through queries made via a query manager module 164 with respect to which the distress assistance determinator 193, the electronic screens manager 196 and/or other modules operably interface.

Optionally, the system 100 may include connections to the illustrated one or more cloud services 195. For example, the electronic screen 104 may be connected to the cloud service(s) 195 by the Internet and/or one or more wireless and/or wired wide area networks (examples of which were previously herein detailed). Similarly, the server system 108 may be connected to the cloud service(s) 195 by the Internet and/or one or more wireless and/or wired wide area networks (examples of which were previously herein detailed). The cloud service(s) 195 which may, amongst other things, include neural network(s), and may also include functionality similar and/or complementary to functionality provided by the server system 108. In some examples, part or all of the databases that the server system 108 includes may instead be provided by "CLOUD STORAGE" of the cloud service(s) 195.

The illustrated system 100 also includes a plurality of camera devices 1031-103N (hereinafter interchangeably referred to as "cameras 1031-103N" when referring to all of the illustrated cameras, or "camera 103" when referring to any individual one of the plurality) being operable to capture a plurality of images and produce image data representing the plurality of captured images. The camera 103 is an image capturing device and includes surveillance video cameras. Furthermore, it will be understood that the system 100 includes any suitable number of cameras (i.e. n is any suitable integer greater than one).

In some examples, some or all of the cameras 1031-103N are geographically located within different premises serviced by the system 100. (Non-limiting examples of possible premises have been previously herein mentioned.)

The camera 103 includes an image sensor 109 (corresponding to one of the sensors 1091-109N shown in FIG. 1) for capturing a plurality of images. The camera 103 may be a digital video camera and the image sensor 109 may output captured light as a digital data. For example, the image sensor 109 may be a CMOS, NMOS, or CCD. In some embodiments, the camera 103 may be an analog camera connected to an encoder. The illustrated camera 103 may be a 2D camera; however use of a structured light 3D camera, a time-of-flight 3D camera, a 3D Light Detection and Ranging (LiDAR) device, a stereo camera, or any other suitable type of camera within the system 100 is contemplated.

The camera 103 may be a dedicated camera. It will be understood that a dedicated camera herein refers to a camera whose principal features is to capture images or video. In some example embodiments, the dedicated camera may perform functions associated with the captured images or video, such as but not limited to processing the image data produced by it or by another camera. For example, the dedicated camera may be a surveillance camera, such as any one of a Pan-Tilt-Zoom (PTZ) camera, dome camera, in-ceiling camera, box camera, and bullet camera.

Additionally, or alternatively, the camera 103 may include an embedded camera. It will be understood that an embedded camera herein refers to a camera that is embedded within a device that is operational to perform functions that are unrelated to the captured image or video. For example, the embedded camera may be a camera found on any one of a vehicle, a security panel, doorbell device, etc.

The illustrated camera 103 includes one or more processors 113 (corresponding to one of the processors 1131-113N shown in FIG. 1), one or more video analytics modules 119 (corresponding to one of the video analytics modules 1191-119N shown in FIG. 1), and one or more memory devices 115 (corresponding to one of the memories 1151-115N shown in FIG. 1) coupled to the processors and one or more network interfaces. Regarding the video analytics module 119, this generates metadata outputted to the server system 108. The metadata can include, for example, records which describe various detections of objects such as, for instance, pixel locations for the detected object in respect of a first record and a last record for the camera within which the respective metadata is being generated. In at least some examples, the video analytics module 119 includes learning machine(s) in support of the operation of the video analytics module 119.

Regarding the memory device 115, this can include a local memory (such as, for example, a RAM and a cache memory) employed during execution of program instructions. Regarding the processor 113, this executes computer program instructions (such as, for example, an operating system and/or software programs), which can be stored in the memory device 115.

In various embodiments the processor 113 may be implemented by any suitable processing circuit having one or more circuit units, including a digital signal processor (DSP), graphics processing unit (GPU) embedded processor, a visual processing unit or a vison processing unit (both referred to herein as "VPU"), etc., and any suitable combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any suitable combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example. A system on a chip (SOC) implementation is also common, where a plurality of the components of the camera 103, including the processor 113, may be combined together on one semiconductor chip. For example, the processor 113, the memory device 115 and the network interface of the camera 103 may be implemented within a SOC. Furthermore, when implemented in this way, a general purpose processor and one or more of a GPU or VPU, and a DSP may be implemented together within the SOC.

In various example embodiments, the memory device 115 coupled to the processor 113 is operable to store data and computer program instructions. The memory device 115 may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device 115 may be operable to store memory as volatile memory, non-volatile memory, dynamic memory, etc. or any combination thereof.

Continuing with FIG. 1, the camera 103 is coupled to the server system 108. In some examples, the camera 103 is coupled to the server system 108 via one or more suitable networks. These networks can include the Internet, or one or more other public/private networks coupled together by network switches or other communication elements. The network(s) could be of the form of, for example, client-server networks, peer-to-peer networks, etc. Data connections between the camera 103 and the server system 108 can be any number of known arrangements, examples of which were previously herein detailed.

Figure 2:
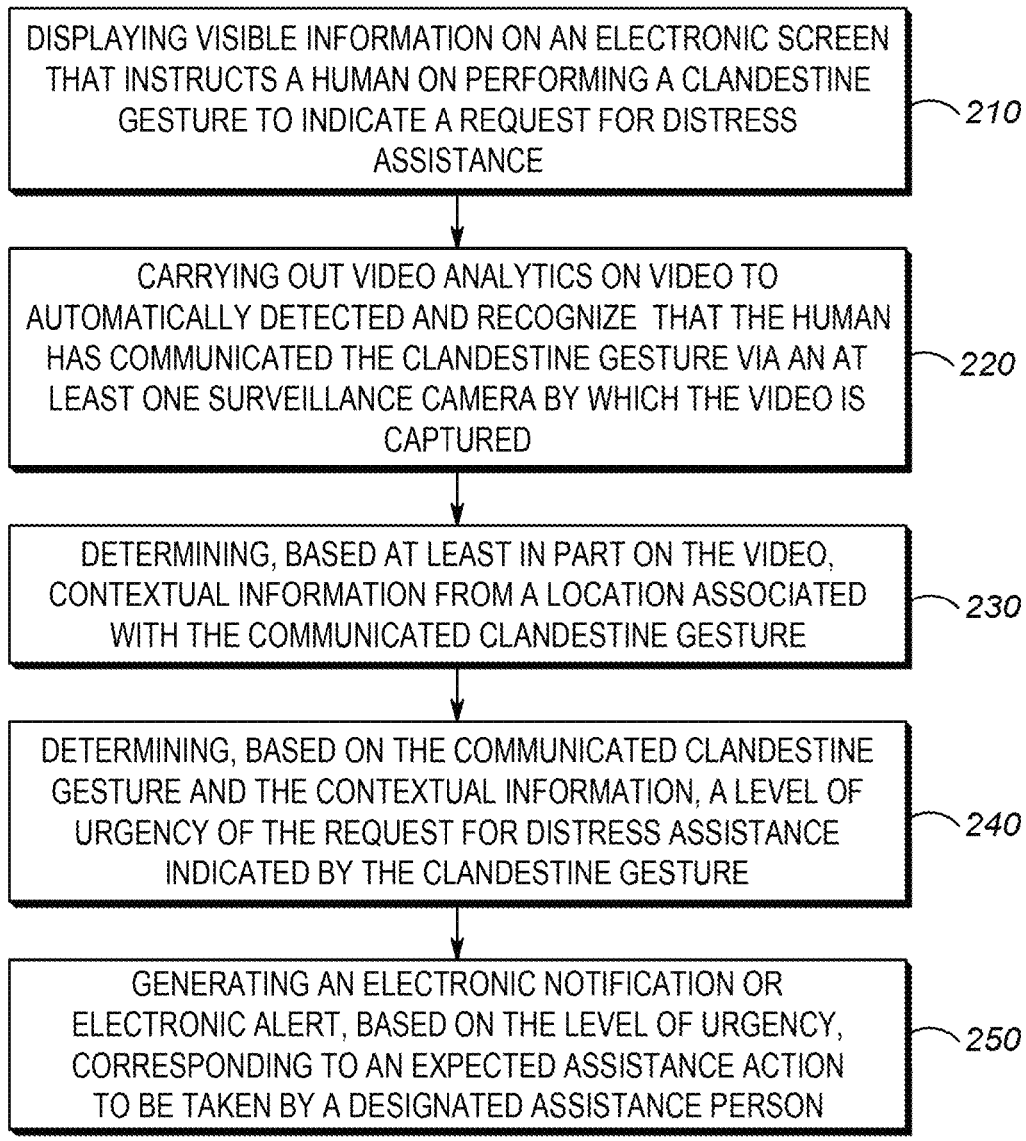
FIG. 2 is a flow chart illustrating a computer-implemented method in accordance with an example embodiment.

Reference is made to FIG. 2. FIG. 2 is a flow chart illustrating a method 200 in accordance with an example embodiment. Firstly in the method 200, visible information is displayed (210) on an electronic screen that instructs a human on performing a clandestine gesture to indicate a request for distress assistance.

It will be understood that the clandestine gesture may be a single, observable human movement, or the clandestine gesture may alternatively be some combination of observable human movements. The human movement(s) may include fine motor movement (e.g. fingers), movement of an appendage or limb, interactive movement between a person's body and an appendage or limb, body movement, distinct facial movement of facial features, etcetera. The selection of human movements that make up clandestine gestures recognized within the system 100 will vary depending on, for example, the system's analytics capabilities (or lack thereof) to recognize gestures within video frame regions that are smaller defined relative to the entire human object.

Figure 3:
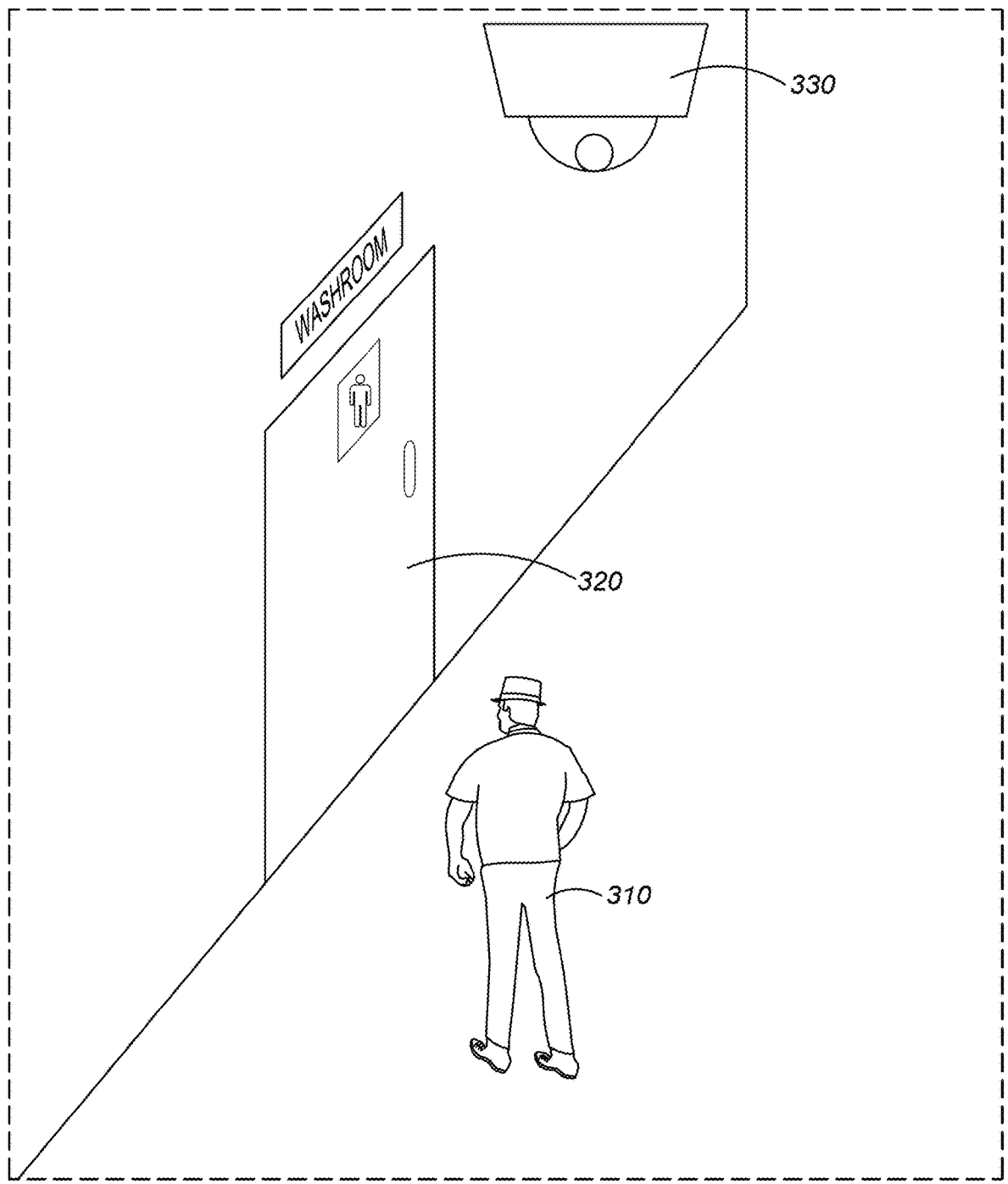
FIG. 3 is a diagram illustrating a beginning of an example distress assistance scenario, where a person is approaching a washroom.
Figure 4:
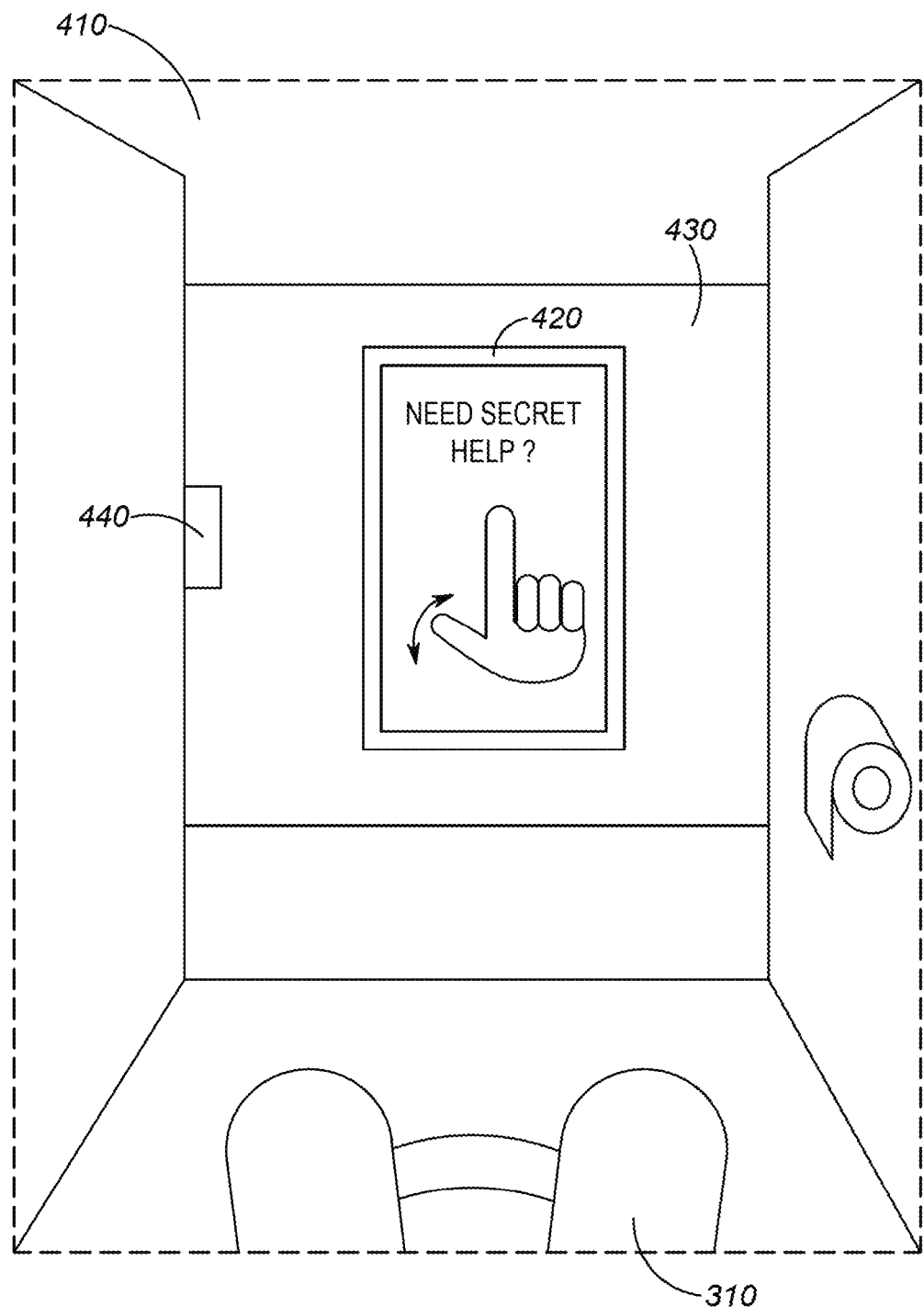
FIG. 4 is a diagram illustrating the aforementioned person inside a toilet stall in the example distress assistance scenario.

With continuing reference to the action 210 of the method 200, FIGS. 3 and 4 are diagrams illustrating additional details in accordance with some examples of the method 200. In FIG. 3, a person (human) 310 is approaching a washroom door 320. A surveillance camera 330, which has a respective FOV, captures images and/or video of the person 310 while he remains within the FOV. Also, it will be noted that the surveillance camera 330 may be alike in construction and function to the previously described camera 103). In some examples, the system 100 includes one or more other surveillance cameras at other entry/exit locations for rooms where privacy stalls may be found.

In FIG. 4 the person 310 has entered the washroom and is present within a toilet stall 410. An electronic screen 420 is attached to a door 430 of the toilet stall 410 (the electronic screen 420 may be alike in construction and function to the previously described electronic screen 104). Also, it will be appreciated that while a toilet stall is what is illustrated in FIG. 4, in alternative examples some other type of privacy stall may be equally consistent with implementation of the method 200. For instance, instead of the privacy stall being a toilet stall, the privacy stall could alternatively be a dressing room stall.

Still with reference to FIG. 4, a lock sensor 440 is installed on the door 430 of the toilet stall 410. The lock sensor 440 may be configured to transmit a first signal upon locking of the door 430 to trigger a beginning of a period of time during which certain defined visible information will appear on the electronic screen 420, or alternatively the lock sensor 440 may be configured to transmit a second signal upon unlocking of the door 430 to trigger an end of the period of time, or alternatively the lock sensor 440 may be configured to transmit both the first and second signals upon locking and unlocking of the door 430 respectively. As yet another alternative, in some examples there may be no lock sensor 440, and instead what is displayed on the electronic screen 420 may be controlled in part by a timer internal to the electronic screen 420, or in some other manner such, for instance, via control signals generated remotely by the server system 108 and delivered wirelessly to the electronic screen 420.

The visible information on the electronic screen 420 may include at least one of i) text; and ii) one or more images (for example, static images, pictorial animations, etcetera). This visible information instructs the human 310 on the performance of the clandestine gesture that will indicate a request for distress assistance. The visible information will cease to appear on the electronic screen 420 after the period of time. After the period of time, a new period of time will begin and different visible information will then appear on the electronic screen 420 corresponding to instructions on performance of a different clandestine gesture that will also indicate a request for distress assistance. In some examples, the order in which different unique instructions appear on the electronic screen 420 may be random (for example, the electronic screens manager 196 of the server system 108 may randomize the order in which different unique instructions appear).

The above-described visible information may be accompanied by additional visible information where appropriate. The additional visible information may include, for example, a warning regarding not misusing the clandestine gesture by performing it when distress assistance is not in fact needed.

With reference again to FIG. 2, following the action 210 video analytics is carried out (220) on video to automatically detect and recognize that the human has communicated the clandestine gesture via an at least one surveillance camera by which the video is captured.

Figure 5:
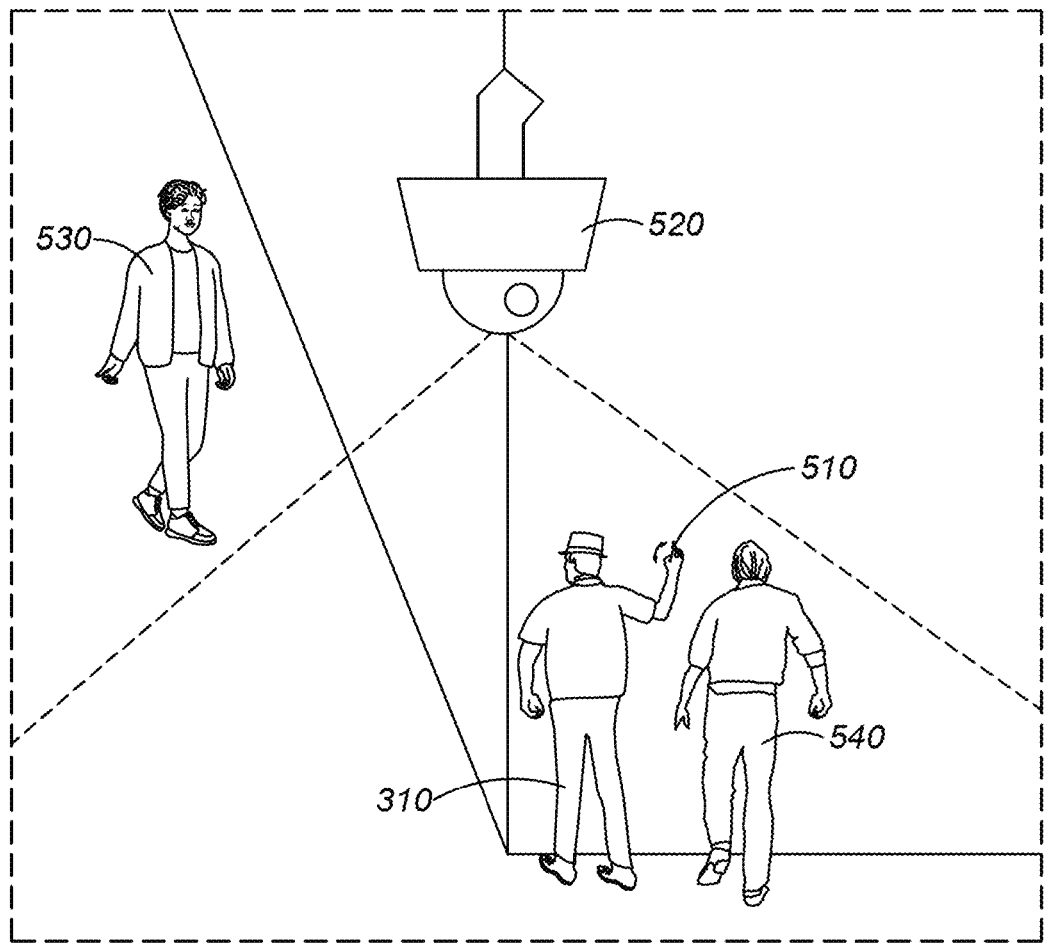
FIG. 5 is a diagram illustrating the aforementioned person performing a clandestine gesture in the example distress assistance scenario.

Regarding the action 220, FIG. 5 is a diagram illustrating additional details in accordance with some examples of the method 200. In FIG. 5, the person 310 has left the washroom and moved on to a different location. At this new location, the person 310 makes a hand gesture 510 when he comes within a Field Of View (FOV) of surveillance camera 520 (the surveillance camera 520 may be alike in construction and function to the previously described camera 103, but has been installed at a different location than the surveillance camera 330). The hand gesture 510 will match instructions which were only provided to the person 310, i.e. provided previously via the electronic screen 420 (FIG. 4). Thus, captors 530 and 540 (who are holding the person 310 captive) should not appreciate the meaning of the hand gesture 510.

With reference again to FIG. 2, following the action 220 contextual information is determined (230), based at least in part on the video, from a location associated with the communicated clandestine gesture. In some examples, this location is remote from the electronic screen 420.

Next in the method 200, a level of urgency of the request for distress assistance indicated by the clandestine gesture is determined (240). More specifically, this determining is based on the communicated clandestine gesture and the contextual information.

In some examples, the action 240 includes determining whether an aggregate score generated from a combination of both a gesture certainty score and a circumstance score exceeds one or more thresholds. In at least one example, the one or more thresholds may be a plurality of thresholds, and the level of urgency is lower when only a first threshold of the plurality of thresholds is exceeded, than when both the first threshold and a second threshold of the plurality of thresholds is exceeded.

In at least one example, a gesture certainty score may be lower or higher depending on results on an appearance search. In particular, the appearance search may be carried out on recorded video surveillance footage to determine whether or not the human 310 was present, prior to the human 310 having communicated the clandestine gesture, at another location corresponding to the electronic screen 420 during the time period when the visible information corresponding to the communicated clandestine gesture was known to have been displayed. This appearance search may be focused (i.e. narrowly time-defined) based on the data in the database 191. As an alternative or in addition to appearance search, it is contemplated that facial recognition and/or object tracking between different cameras may be employed for a similar purpose.

After the appearance search is completed, a higher gesture certainty score may be the result when the human 310 is determined to have been present at the another location during the time period than when the human 310 is determined to have not been present at the another location during the time period.

Another factor that may influence the gesture certainty score is confidence from the video analytics that a particular clandestine gesture was actually performed, where the video analytics is carried out by, for instance, the video analytics module 119 and/or the video analytics engine 194. In some examples, completeness and/or correct order of human movements in a clandestine gesture may be expected to correspond to a higher gesture certainty score than where the human movements occur out of order and/or are incompletely performed. In at least one example where the camera 103 may optionally include a microphone (i.e. for capturing audio), the gesture certainty score may be increased when an expected code word is spoken contemporaneously with performance of the clandestine gesture.

Regarding the circumstance score, this is derived from contextual information (including video at one or more surveilled locations such as, for instance, the location where the clandestine gesture was communicated). Examples of factors that may influence the circumstance score include whether or not other people are near or accompanying the person needing assistance (and the number of such other people), facial expression analysis, attire of the person needing assistance (or attire of other relevant people), probable age of the person needing assistance (or probable age of other relevant people), visible health-related signs exhibited by the person needing assistance, etcetera. In at least one example, machine learning (such as, for example, one or more convolutional neural networks) may be trained and employed to recognize at least one or more or the following: companions/guardian figures, strangers interacting with the person making the gesture, and aggressors/threats. The machine learning may also be adjusted based on the type of the site(s) being surveilled (such as, for example, higher sensitivity to detect and recognize human trafficking at transportation hub, higher sensitivity to detect and recognize bullying at schools, etcetera).

Figure 6:
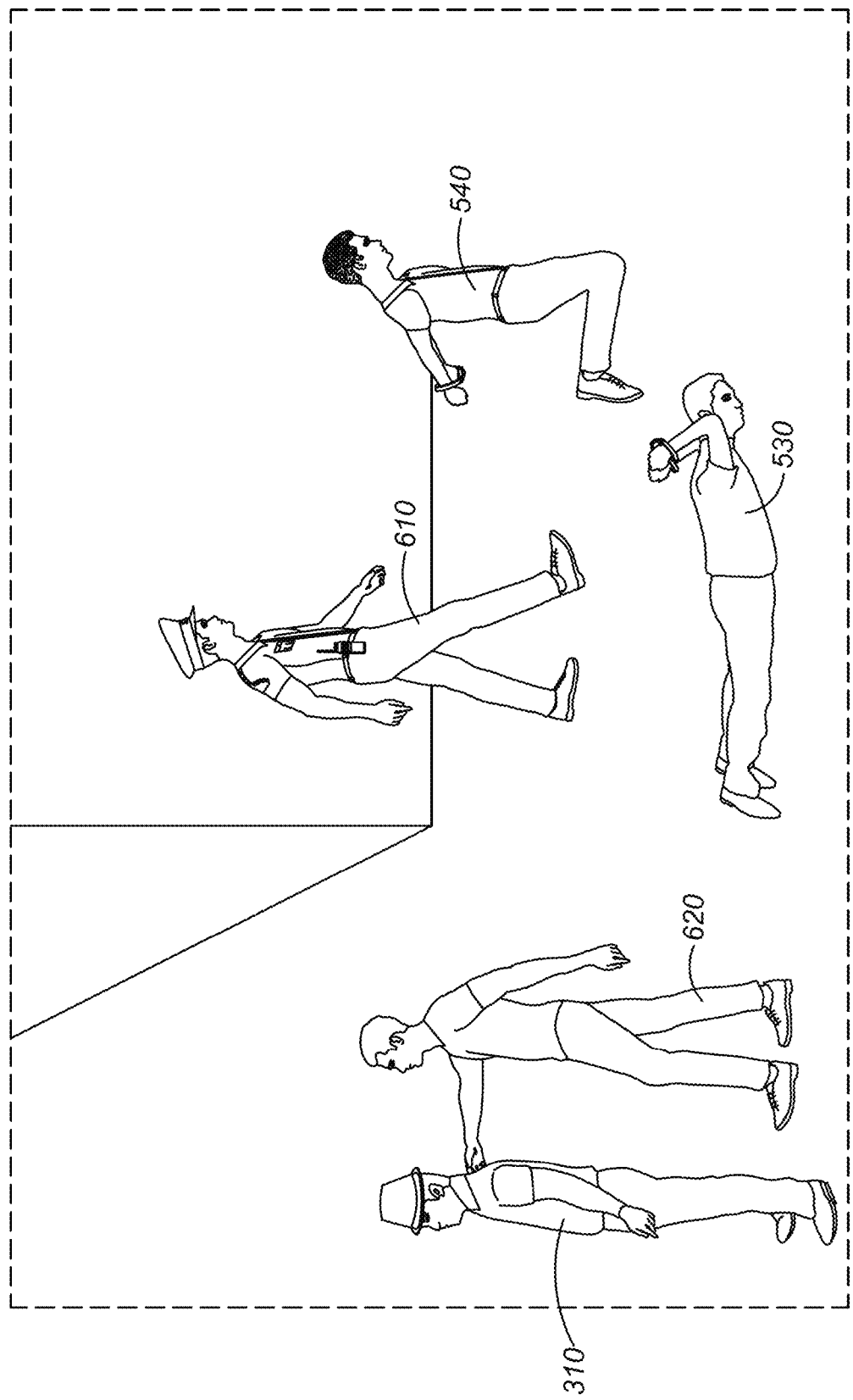
FIG. 6 is a diagram illustrating the aforementioned person being rescued from captors in the example distress assistance scenario.

Next in the method 200, an electronic notification or electronic alert is generated (250) based on the level of urgency. The electronic notification or electronic alert corresponds to an expected assistance action to be taken by a designated assistance person. This expected assistance action may be, for example, the deployment of help to the location of the person 310 as shown in FIG. 6. In FIG. 6, at a point in time subsequent to the action 250, a police officer 610 arrests the captors 530 and 540, and another person 620 escorts the person 310 to a safe location away from the captors 530 and 540. (It will be understood that the people of concern to the person needing distress assistance need not necessarily be "captors". These people may instead by harassers, potentially dangerous people, etc.)

In some examples, the above-mentioned electronic notification or electronic alert informs as to a time and a type of the expected assistance action to be taken.

In some examples, the electronic notification or electronic alert is geo-bounded over a subarea of the premises where the system 100 is installed, and computer program instructions may be executed by an at least one processor to cause determining of a designated assistance person that is located within the subarea. It is also contemplated that selection of the designated assistance person(s) may be dynamic (such as, for example, a private security guard for a low level alert, police for a high level alert, etcetera).

In some examples, the server system 108 may generate of a video clip (carried out by, for example, the distress assistance determinator 193, or some other module) that is a sub portion of the video highlighting when the human 310 communicated the clandestine gesture. The video clip may be provided to authorized users of the system 100 (for example, flagged in a video management system, or included in an electronic notification or electronic alert).

In some examples, the cameras 1031-103N are spread across multiple security sites. In such examples, each site may negotiate with other sites for cooperative sharing of electronic alerts and video. For instance, it is contemplated that a low level alert at a first security site may be registered at a second security site, such that when a similar alert is raised later at the second site the existence of the previous low level alert might increase chances of the next alert being issued as a high level alert (instead of a low level alert).

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot generate electronic notifications or electronic alerts, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system comprising:
    an electronic screen configured to display visible information that comprises at least one of: i) text; and ii) one or more images, and the visible information instructing on a human performance of a clandestine gesture that will indicate a request for distress assistance, wherein the visible information will cease to appear on the electronic screen after a period of time;
    at least one surveillance camera configured to capture video within which a human appears;
    at least one processor in communication with the at least one surveillance camera; and
    at least one electronic storage medium storing program instructions that when executed by the at least one processor cause the at least one processor to perform:
        carrying out video analytics on the video to automatically detect and recognize that the human has communicated the clandestine gesture via the at least one surveillance camera;
        determining, based at least in part on the video, contextual information from a location associated with the communicated clandestine gesture, wherein the location is remote from the electronic screen;
        determining, based on the communicated clandestine gesture and the contextual information, a level of urgency of the request for distress assistance indicated by the clandestine gesture; and
        generating an electronic notification or electronic alert, based on the level of urgency, corresponding to an expected assistance action to be taken by a designated assistance person.

2. The system of claim 1 wherein the determining the level of urgency comprises determining whether an aggregate score generated from a combination of both a gesture certainty score and a circumstance score exceeds one or more thresholds.

3. The system of claim 2 wherein the one or more thresholds is a plurality of thresholds, and the level of urgency is lower when only a first threshold of the plurality of thresholds is exceeded, than when both the first threshold and a second threshold of the plurality of thresholds is exceeded.

4. The system of claim 2 wherein:
    the at least one surveillance camera is a plurality of surveillance cameras,
    execution of the program instructions by the at least one processor further causes carrying out an appearance search to determine whether or not the human was present, prior to the human having communicated the clandestine gesture, at another location corresponding to the electronic screen during the time period when the visible information was displayed, and
    the gesture certainty score being higher when the human is determined to have been present at the another location during the time period than when the human is determined to have not been present at the another location during the time period.

5. The system of claim 1 wherein the electronic notification or electronic alert informs as to a time and a type of the expected assistance action to be taken.

6. The system of claim 1 wherein the electronic screen comprises a fixed-location display installable in a privacy stall of at least one of: a transportation hub, a convention center, an alcohol serving establishment, and a school.

7. The system of claim 6 further comprising a lock sensor installable on a door of the privacy stall, the lock sensor configured to transmit a first signal upon locking of the door to trigger a beginning of the period of time, a second signal upon unlocking of the door to trigger an end of the period of time, or both the first and second signals upon locking and unlocking of the door respectively.

8. The system of claim 1 further comprising a mobile electronics device configured to:
    wirelessly receive the electronic notification or electronic alert, and
    perceivably output the electronic notification or electronic alert as at least one of a visible message displayed on a screen of the mobile electronics device and an audible message emitted from a speaker of the mobile electronics device.

9. The system of claim 1 wherein execution of the program instructions by the at least one processor further causes generating of a video clip that is a sub portion of the video highlighting when the human communicated the clandestine gesture.

10. At least one network comprising a system as claimed in claim 1,
    wherein the system is installed in a premises.

11. The at least one network as claimed in claim 10 wherein the premises is a transportation hub, a convention center, an alcohol serving establishment or a school.

12. The at least one network as claimed in claim 10 wherein the electronic notification or electronic alert is geo-bounded over a subarea of the premises, and execution of the program instructions by the at least one processor further causes determining that the designated assistance person is located within the subarea.

13. A computer-implemented method comprising:
carrying out video analytics on video to automatically detect and recognize that a human has communicated a clandestine gesture via an at least one surveillance camera that captured the video;
determining, using an at least one processor and based at least in part on the video, contextual information from a location associated with the communicated clandestine gesture, wherein the location is remote from an electronic screen that, prior to the human having communicated the clandestine gesture, displayed visible information that instructed the human on performing the clandestine gesture to indicate a request for distress assistance;
determining, using an the least one processor and based on the communicated clandestine gesture and the contextual information, a level of urgency of the request for distress assistance indicated by the clandestine gesture; and
generating, using an the least one processor, an electronic notification or electronic alert, based on the level of urgency, corresponding to an expected assistance action to be taken by a designated assistance person.

14. The computer-implemented method of claim 13 wherein the determining the level of urgency comprises determining whether an aggregate score generated from a combination of both a gesture certainty score and a circumstance score exceeds one or more thresholds.

15. The computer-implemented method of claim 14 wherein the one or more thresholds is a plurality of thresholds, and the level of urgency is lower when only a first threshold of the plurality of thresholds is exceeded, than when both the first threshold and a second threshold of the plurality of thresholds is exceeded.

16. The computer-implemented method of claim 13 wherein the electronic notification or electronic alert informs as to a time and a type of the expected assistance action to be taken.

17. The computer-implemented method of claim 13 further comprising generating a video clip that is a sub portion of the video highlighting when the human communicated the clandestine gesture.

18. The computer-implemented method of claim 13 wherein the electronic notification or electronic alert is geo-bounded over a subarea of a premises.

19. The computer-implemented method of claim 18 further comprising determining that the designated assistance person is located within the subarea.

* * * * *